(12) United States Patent
Shim

(10) Patent No.: US 12,662,392 B2
(45) Date of Patent: Jun. 23, 2026

(54) CASCADING CO-PRECIPITATION SYSTEM

(71) Applicant: Ascend Elements, Inc., Westborough, MA (US)

(72) Inventor: Jong Hyun Shim, Westborough, MA (US)

(73) Assignee: Ascend Elements, Inc., Westborough, MA (US)

( * ) Notice: Subject to any disclaimer, the term of this patent is extended or adjusted under 35 U.S.C. 154(b) by 605 days.

(21) Appl. No.: 18/129,479

(22) Filed: Mar. 31, 2023

(65) Prior Publication Data

US 2024/0327238 A1 Oct. 3, 2024

(51) Int. Cl.
*C01G 53/40* (2025.01)
*B01D 21/01* (2006.01)
*H01M 10/54* (2006.01)

(52) U.S. Cl.
CPC ............ *C01G 53/40* (2013.01); *B01D 21/01* (2013.01); *H01M 10/54* (2013.01); *C01P 2004/32* (2013.01); *C01P 2004/61* (2013.01); *C01P 2006/11* (2013.01); *C01P 2006/40* (2013.01); *C01P 2006/80* (2013.01)

(58) Field of Classification Search
CPC ........ C01G 53/40; C01G 53/82; B01D 21/01; H01M 10/54; H01M 4/505; H01M 4/525; C01P 2004/32; C01P 2004/61; C01P 2006/11; C01P 2006/40; C01P 2006/80; Y02W 30/84
See application file for complete search history.

(56) References Cited

U.S. PATENT DOCUMENTS

2021/0371298 A1* 12/2021 Beierling ............... C01G 53/00
2022/0205064 A1 6/2022 Szolga, Jr. et al.

FOREIGN PATENT DOCUMENTS

CN 114250362 A 3/2022
KR 11-269699 A 10/1999

OTHER PUBLICATIONS

International Search Report, PCT/US2023/017104, /Dec. 20, 2023, pp. 1-3.

* cited by examiner

*Primary Examiner* — Daniel Berns
*Assistant Examiner* — Joshua Maxwell Speer
(74) *Attorney, Agent, or Firm* — Armis IP Law, LLC

(57) ABSTRACT

A hydrometallurgical coprecipitation process for leached cathode materials includes adjusting a pH and agitation of an aqueous acidic leach solution in successive stages of a multi-stage reactor system for generating coprecipitated particles of a targeted morphology, particle size range, and surface characteristics. The aqueous acidic leach solution (leach solution) initially forms seed particles based on increasing pH. In successive stages, the pH and the stirring rate are varied for growing the seed particles into progressively larger particles as additional leach solution is introduced.

18 Claims, 2 Drawing Sheets

CASCADING CO-PRECIPITATION SYSTEM

BACKGROUND

Lithium-ion (Li-ion) batteries are a preferred chemistry for secondary (rechargeable) batteries in high discharge applications such as electrical vehicles (EVs) and power tools where electric motors are called upon for rapid acceleration. Li-ion batteries include a charge material, conductive powder and binder applied to or deposited on a current collector, typically a planar sheet of copper or aluminum. The charge material includes anode charge material, typically graphite or carbon, and cathode charge material, which includes a predetermined ratio of metals such as lithium, nickel, manganese, cobalt, aluminum, iron and phosphorous, defining a so-called "battery chemistry" of the Li-ion cells. Recycled charge material involves a coprecipitation of leached metals in solution according to the predetermined ratio. Recycling of the Li-ion batteries recovers large amounts of charge material metals that would otherwise need to be sourced from controlled sources, typically as a result of mining and refining.

SUMMARY

A hydrometallurgical coprecipitation process for an aqueous acidic solution containing leached cathode materials is disclosed which includes adjusting the pH and agitation (stir rate) of the aqueous acidic leach solution in successive stages of a multi-stage reactor system for generating coprecipitated particles of a preferred morphology, particle size range, and surface characteristic. The aqueous acidic leach solution (leach solution) initially forms small seed particles in a first stage reactor based on an increasing pH, and coprecipitation occurs in successive stages with conditions that are varied at each stage, such as the pH and the stirring rate, as additional leach solution is provided for growing the seed particles into successively larger particles. The added leach solution has a molar ratio of dissolved metals that are chosen to assure the finished product exhibits the intended chemistry. In general, the additional volume afforded by additional cascading reactors at each successive stage serves to maintain a similar surface area/volume ratio and solids content in each reactor for forming the slurry of precipitated and growing particles.

Configurations herein are based, in part, on the observation that coprecipitation of a ratio-adjusted leach solution assures a consistent battery chemistry formulation in a precursor Cathode Active Material (pCAM) used to form recycled battery cells. A comingled leach solution formed from spent cathode materials is adjusted through the addition of metal salts to form a ratio-adjusted leach solution, usually according to customer or industry standards that set the desired target ratio of the charge material metals. Similar approaches may be undertaken for anode material. However, as this is usually dominated by graphite and other carbon forms, ratio adjustment is often not required.

Unfortunately, conventional approaches to coprecipitation suffer from the shortcoming of particle size variations in the coprecipitated product. While ratio adjustment is preserved, particle growth and rate of precipitation may result in a range of particle sizes and varied sphericity (consistency in the spherical shape of the particles). Accordingly, configurations herein substantially overcome the shortcomings of conventional coprecipitation processes by transitioning the leach solution and coprecipitated particles through a multi-stage reactor system where each successive stage is configured to produce particles having specific characteristics, such as size and shape, by adjusting the pH and agitation rate (stir rate) at each stage. The result is consistency in particle size, surface quality, and sphericity of the finished pCAM product.

In further detail, the method of producing a cathode material precursor from a recycled lithium-ion battery stream includes forming a slurry of metal hydroxide seeds by combining a first aqueous acidic leach solution comprising metal salts, a first aqueous chelating agent solution, and a first aqueous base solution in a first stage reactor of a multi-stage reactor system. By aqueous is meant that the solution comprises greater than 50% water. Co-precipitation of the metal salts from the first aqueous acidic leach solution is induced at a first pH and at a first stir rate to form the slurry of metal hydroxide seeds. Upon attaining a targeted seed particle size, the slurry of metal hydroxide seeds from the first stage reactor is transferred through a series of successive reactor stages that include at least one additional reactor than the previous stage of the multi-stage reactor system. The particle size increases as the conditions in the reactors of each subsequent stage are changed, which may include, for example, adjusting the pH, stir rate, and/or temperature as described in more detail below. However, preferably, the ratio of metal salts is maintained at each stage. In this way, a cathode material precursor having the target ratio of charge material metals and having a desirable narrow particle size distribution can be prepared.

BRIEF DESCRIPTION OF THE DRAWINGS

The foregoing and other features will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles of the invention.

DETAILED DESCRIPTION

Depicted below is a method for coprecipitation of cathode material precursor in a granular form, which can subsequently be used in the production of recycled Li-ion batteries. Cathode material is shown in this coprecipitation example, although any suitable metal salts may also be formed using the disclosed approach. Using this method, charge material precursor is preferably prepared in a granular form having particle size and surface qualities called for by customer specifications.

Figure 1:
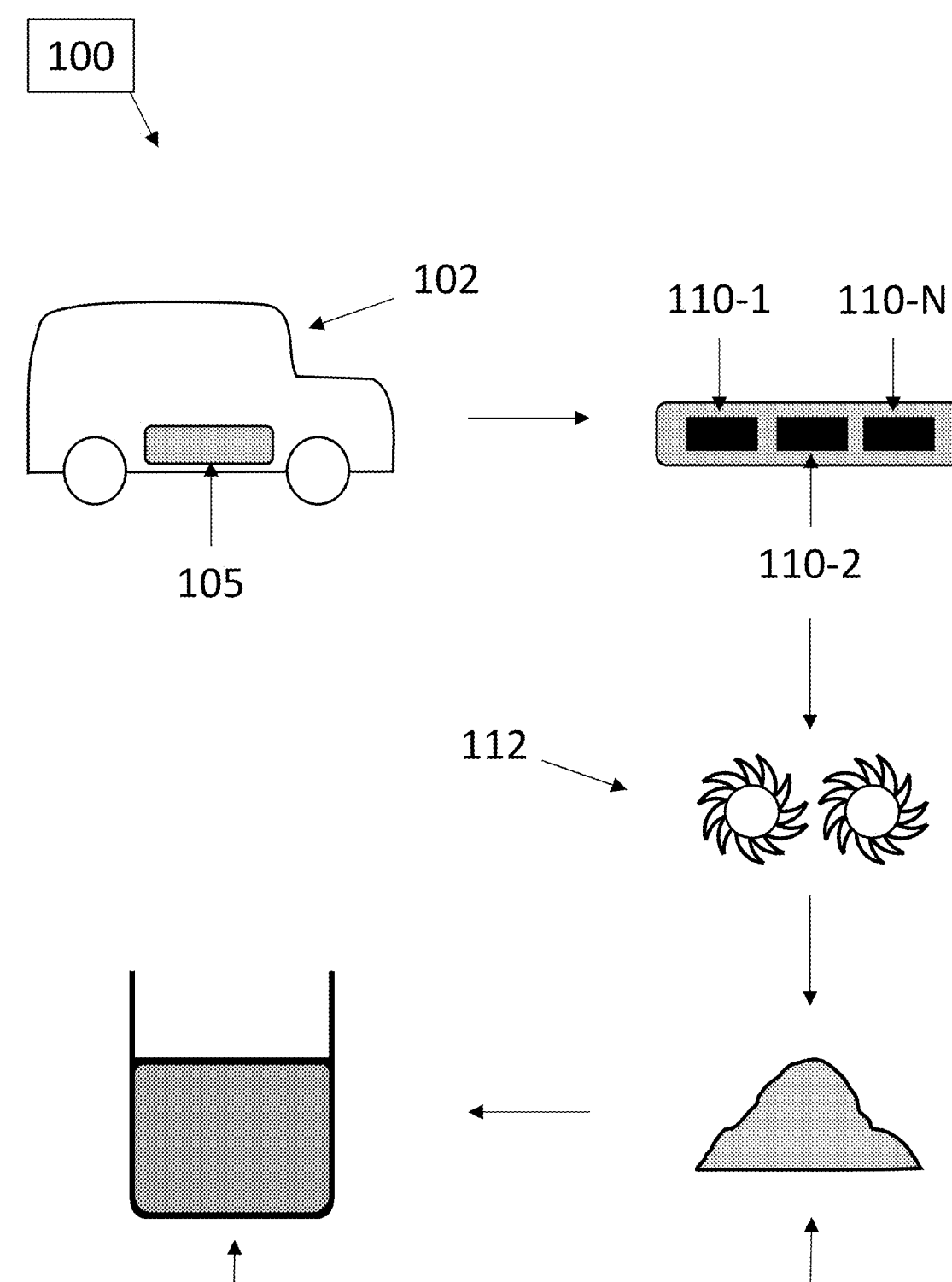
FIG. 1 is a context diagram of a recycling environment suitable for use with configurations herein.

FIG. 1 is a context diagram of a recycling environment 100 suitable for use with configurations herein. Referring to FIG. 1, in a Li-ion battery recycling stream, an end-of-life battery pack 105 is obtained from a vehicle 102. The battery pack, typically having a physical case shaped to attach to the underside of the vehicle 102 according to manufacturer specifications, includes a plurality of interconnected battery cells 110-1 through 110-N (110 generally). In order to release the battery materials for recycling, the battery packs 105 and cells 110 therein are physically shredded to produce a granular combination of battery components 120, sometimes referred to as a black mass. This granular mixture of recycled battery materials comprises a both anode and cathode components such as nickel, manganese, cobalt, aluminum, lithium and graphite, depending on the battery chemistry of the battery recycling stream. In order to be efficient, mechanically intensive processing equipment is preferably used, such as shredders 112, grinders, pulverizers, or other forms of physical agitation that incur a randomness of contact between the materials in the battery packs. A collective quantity of such battery packs 105 forms a recycling stream of Li-ion batteries amenable to the recycling process disclosed herein.

Once formed, the granular black mass 120, including cathode materials, anode materials, current collectors and casing materials, is combined with a leaching agent to form a leach solution 122 that includes extracted charge material metals. For example, as disclosed in U.S. Pat. No. 9,834,827 and continuations thereof, incorporated by reference herein, the black mass is leached with a sulfuric acid solution containing a reducing agent such as hydrogen peroxide. Other acids, such as hydrochloric acid, can also be used. As a result, leach solution 122 is generally a relatively low pH solution of dissolved metal salts, which tends to coprecipitate as the pH is increased, such as with the addition of an aqueous solution of a base (e.g., sodium hydroxide). The ratio of the metal salts in the leach solution can also be adjusted to a selected target ratio, as needed, with the addition of virgin or control metal salts. In the case of an NMC battery chemistry, for example, nickel, manganese and/or cobalt sulfate can be added to the leach solution until the target ratio is attained. In configurations herein, coprecipitation conditions are controlled, including the pH and agitation or stir rate, as the leach solution passes through various stages of a multi-stage reactor to cause particles of cathode active material precursor to form with a consistent size and shape that can then be sourced for new, recycled battery cells. Typically, this is a hydroxide form of the metals of the batteries from the battery recycling stream and is based on the battery chemistry of the individual cells and pack.

Conventionally, coprecipitation of a leach solution prepared from leaching of a black mass occurs using a batch process. Reagents are added to initiate precipitation, and the amounts can be varied as the resulting particles proceed from seed formation through the growth phases. By enabling control over the specific reaction conditions, the batch process has the advantage of leading to a narrow particle size distribution of the coprecipitated cathode active material precursor. However, batch processes are also typically low productivity processes, and multiple batch reactors are required for large scale production. By comparison, coprecipitation may also occur using a continuous process, such as in a continuous stirred tank reactor (CSTR). However, while the continuous process has the benefit of high productivity, a broader particle size distribution typically results since control over particle seeding and growth is difficult to maintain consistently.

To provide a method and system in which cathode active material precursor can be prepared with high productivity and having both a narrow particle size distribution and homogenous particle shape (i.e., sphericity), the present disclosure describes a cascading multi-stage reactor system in which slurries of growing precursor particles are transferred from reactor(s) of one stage to those of the next stage, with batch-type control over reaction conditions within each stage. This is more clearly shown in FIG. 2, which is a schematic view of an arrangement of a multi-stage reactor system of the present disclosure.

Figure 2:
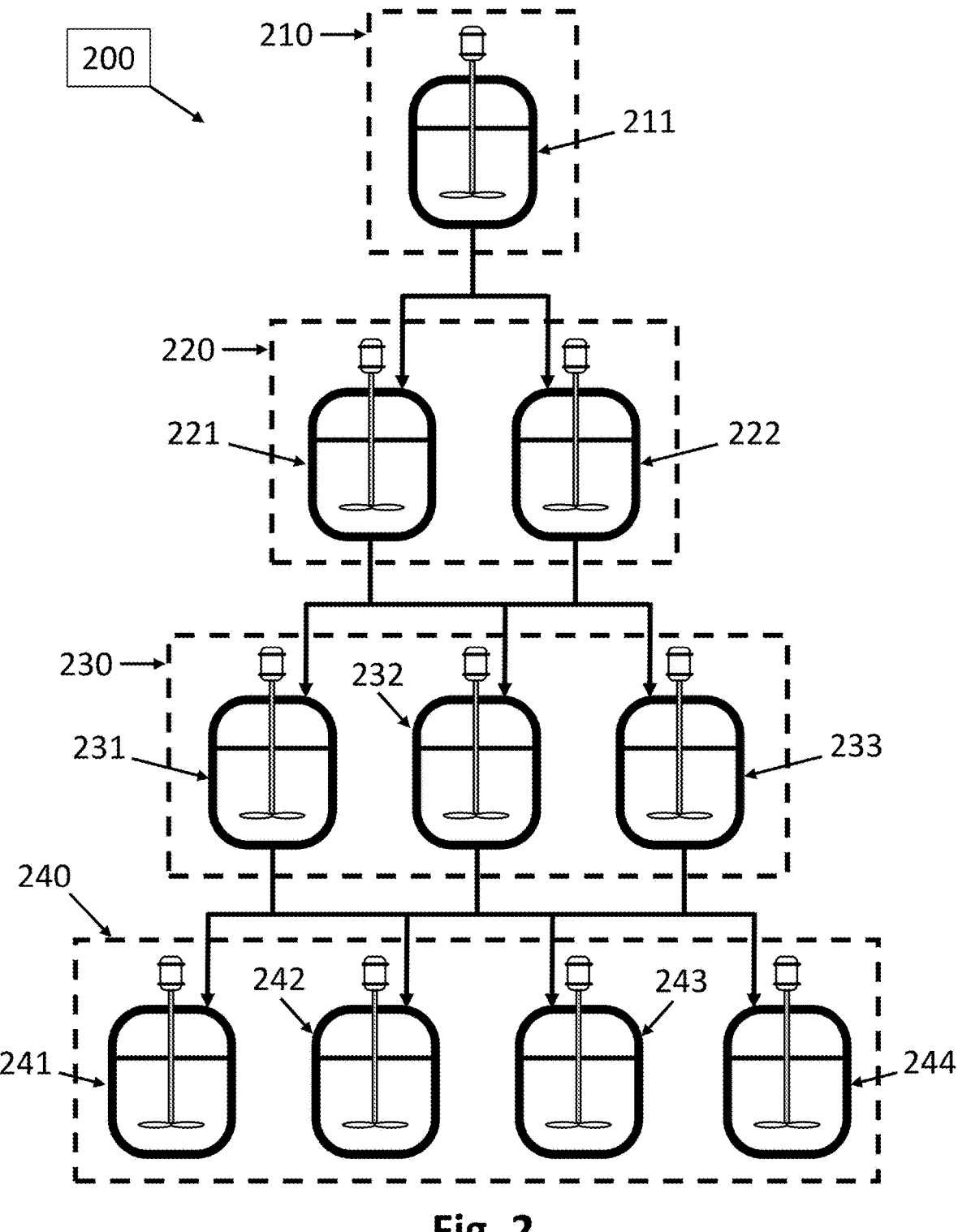
FIG. 2 is a schematic of a multistage reactor system in which the cathode active material precursor can be formed.

Thus, as shown in FIG. 2, a multi-stage reactor system 200 includes successive stages for performing coprecipitation of an acidic aqueous leach solution comprising metal salts in which each stage has more batch reactors than the preceding stage. Each reactor is equipped for stirring, heating, and fluid transfer, both into and out of the reactor. For example, as shown in this specific configuration, the reactor system comprises 4 individual stages, 210, 220, 230, and 240. However, additional stages or fewer stages may also be provided depending, for example, on the specification of the product to be prepared, such as the particle size distribution. For example, additional stages may enable a further refinement of the particle size distribution while fewer stages provide a broader distribution but use less capital equipment. Also, for this specific configuration, each successive stage includes at least one additional reactor compared to the immediately preceding stage. For example, stage 230 includes one more reactor than stage 220, which includes one more reactor than stage 210. However, a stage may include two, three, or more additional reactors compared to its previous stage, depending on the volume of material and the relative size of the reactors.

The reactors within a stage are in fluid communication with and downstream of the reactors of the immediately preceding stage. In this way, the contents of the reactors of one stage (such as reactors 231, 232, and 233) can flow (cascade) to the reactors of the next stage (reactors 241, 242, 243, and 244), which may be triggered when certain specified conditions are met, as discussed in more detail below.

In addition, each reactor of each stage is also configured for receiving an aqueous acidic leach solution comprising metal salts as well as an aqueous base solution and an aqueous chelating agent solution. The coprecipitation process can thereby be separately controlled within a particular stage and, when completed, transferred to the next stage for further reaction. The now empty reactor(s) can then be refilled with the contents of the previous stage, making this a continuous cascading process.

A cathode material precursor having high sphericity and narrow particle size distribution can be readily prepared from a recycled lithium-ion battery stream using the multi-stage reactor of the present disclosure. As a general method, a slurry of metal hydroxide seeds is formed by combining a first aqueous acidic leach solution comprising metal salts (such as aqueous leach solution 122), a first aqueous chelating agent solution, and a first aqueous base solution in the first stage reactor 210 of the multi-stage reactor system 200. While these components can be added in any order to the first reactor, preferably the first aqueous leach solution is added to the combination of the first aqueous chelating agent solution and the first aqueous base solution. The leach solution may be a ratio-adjusted solution, as described above. Coprecipitation of the metal salts from the first aqueous acidic leach solution at a first pH and at a first stir rate form the slurry of metal hydroxide seeds. After the seeds have grown to a targeted average particle size, the resulting slurry from the first stage reactor is transferred to two or more second stage reactors 220.

In the second stage reactors, a slurry of metal hydroxide intermediate particles is formed by adding a second aqueous acidic leach solution comprising metal salts, a second aqueous chelating agent solution, and a second aqueous base solution to the transferred slurry of metal hydroxide seeds. Coprecipitation of the metal salts from the second aqueous acidic leach solution at a second pH and at a second stir rate form the slurry of metal hydroxide intermediate particles from the metal hydroxide seeds. The second pH is less than the first pH and the second stir rate is less than the first stir rate, which has been found to maximize growth from the seeds and minimize formation of new seeds.

After the intermediate particles have grown to a targeted average particle size, the slurry is transferred to three or more third stage reactors 230. In this third stage, a slurry of metal hydroxide final particles is formed from the intermediate particles by the addition of a third aqueous acidic leach solution comprising metal salts, a third aqueous chelating agent solution, and a third aqueous base solution to the slurry of intermediate particles in the third stage reactors, causing coprecipitation at a third pH and at a third stir rate. The feed rate of the third aqueous acidic leach solution is greater than that used for the second aqueous acidic leach solution in the second stage reactors. Preferably, the pH of the third stage is maintained to be at the same or similar pH as in the second stage, but, with the increased feed rate of the third acidic leach solution, a corresponding increase in the aqueous base solution may be needed to maintain the pH. Also, preferably, the third stir rate is the same as or similar to the stir rate used in the second stage. In this way, the conditions used in the second reactors are maintained in the third reactors, and the increased feed rate of the third acidic leach solution is used for growth of the metal hydroxide intermediate particles into metal hydroxide final particles with no significant seed formation.

After the metal hydroxide final particles have attained a targeted average particle size, the slurry of metal hydroxide final particles is transferred from the third stage reactors 230 to four or more fourth stage reactors 240 of the multi-stage reactor system. This fourth stage is characterized by attaining a more spherical particle having improved surface morphology. Thus, in this fourth stage, a slurry of spherical metal hydroxide particles is formed by adding a fourth aqueous acidic leach solution comprising metal salts, a fourth aqueous chelating agent solution, and a fourth aqueous base solution to the slurry of metal hydroxide final particles and coprecipitating the metal salts from the fourth aqueous leach solution at a fourth pH and at a fourth stir rate to form the slurry of spherical metal hydroxide particles. The amount of the fourth aqueous acidic leach solution that is added is less than the amount of the third aqueous acidic leach solution added in the third stage reactors. The resulting spherical metal hydroxide particles (i.e., the cathode active material precursor) can then be removed from the slurry, such as by filtration, or may be transferred as a slurry to at least one holding tank.

In this method, the aqueous acidic leach solutions used in each stage may be the same or different, depending on the desired composition of the resulting cathode active material precursor. For example, the aqueous acidic leach solutions may comprise the same metal salts in the same ratios, including a nickel salt such as nickel sulfate, a cobalt salt such as cobalt sulfate, and a manganese salt such as manganese sulfate. In this way, a cathode material precursor having a consistent composition from core to surface can be formed. A precursor having a layered or gradient composition may be prepared with leach solutions of different compositions in one or more stages. Furthermore, at least one and preferably each of the aqueous acidic leach solutions may result from leaching of a black mass of recycled batteries followed by ratio adjusting, as described above. Most preferably, each of the leach solutions is a portion of the same batch of ratio-adjusted acidic leach solution, which is then added in portions at each subsequent stage.

The aqueous chelating agent solutions can be the same or different at each stage and can comprise any water-soluble chelating agent known in the art. Preferably, the chelating agent is an ammonium salt such as ammonium hydroxide. For example, the first, second, third, and fourth aqueous chelating agent solutions can have the same concentration of ammonium hydroxide, such as from 1M to 9M, including from 2M to 5M.

Similarly, the aqueous base solutions can also be the same or different at each stage and can comprise any water-soluble base known in the art that can effectively raise the pH of the aqueous acidic leach solution to cause precipitation. Preferably, the base is an hydroxide base such as sodium hydroxide. For example, the first, second, third, and fourth aqueous base solutions can have the same concentration of sodium hydroxide, such as from 0.5M to 5M, including from 1M to 3M.

Thus, in general, the method described herein proceeds through the various batch-type stages of the multi-stage reactor system in a controlled yet continuous process, with coprecipitation progressing from seeding in the first stage, through agglomeration and growth in the second and third stages, to surface tuning in the fourth stage. In each stage, the metal salts are coprecipitated under specific conditions, including pH and stir rate, to produce the desired growth. Also, slurries are transferred from one stage to the next stage based on attaining a target particle size. Suitable examples of these conditions are shown in Table 1 below.

TABLE 1

| Stage | Stir rate | D50 (Average particle size) | pH |
|---|---|---|---|
| 1 | High | 0 to <3 μm | 11-12.5 |
| 2 | Medium | 3-7 μm | 10.5-12 |
| 3 | Low | 7-10 μm | 10.5-12 |
| 4 | Low | 13-15 μm | >10.5 |

In this example, each stage proceeds to a completion condition (D50=average particle size) as shown in Table 1. The temperature is generally maintained between 60° C. and 80° C. at each stage, and a time of 2-5 hours is typical for each stage. However, it is preferred to use the target particle sizes for determining completion. In particular, for the first stage, for example, the slurry of metal hydroxide seeds is preferably transferred from the first stage reactor to the second stage reactors when the metal hydroxide seeds have a measured D50 of less than 3 μm. The slurry of metal hydroxide particles is preferably transferred from the second stage reactors to the third stage reactors when the metal hydroxide intermediate particles have a measured D50 of between 3 μm and 7 μm. The slurry of metal hydroxide final particles is preferably transferred from the third stage reactors to the fourth stage reactors when the metal hydroxide final particles have a D50 of between 7 μm and 10 μm. From the fourth stage reactors, the now mostly spherical particles have a D50 of between 13 and 15 μm and a tap density value between 1.5 and 2.5 g/mL. Other completion conditions may be considered, in addition to greater iterations of the stages.

Subsequent sintering of the cathode material precursor with a Li compound such as lithium carbonate will yield the active cathode material for placement in the new, recycled battery cells.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method of producing a cathode material precursor from a recycled lithium-ion battery stream, comprising:

a) forming a slurry of metal hydroxide seeds by:
combining a first aqueous acidic leach solution comprising metal salts, a first aqueous chelating agent solution, and a first aqueous base solution in a first stage reactor of a multi-stage reactor system, and
co-precipitating the metal salts from the first aqueous acidic leach solution at a first pH and at a first stir rate to form the slurry of metal hydroxide seeds, b) transferring the slurry of metal hydroxide seeds from the first stage reactor to two or more second stage reactors of the multi-stage reactor system, c) forming a slurry of metal hydroxide intermediate particles by:
adding a second aqueous acidic leach solution comprising metal salts, a second aqueous chelating agent solution, and a second aqueous base solution to the slurry of metal hydroxide seeds in the second stage reactors, and
co-precipitating the metal salts from the second aqueous acidic leach solution at a second pH and at a second stir rate to form the slurry of metal hydroxide intermediate particles, wherein the second pH is less than the first pH and the second stir rate is less than the first stir rate, d) transferring the slurry of metal hydroxide intermediate particles from the second stage reactors to three or more third stage reactors of the multi-stage reactor system, wherein the multi-stage reactor system includes more third stage reactors than second stage reactors, e) forming a slurry of metal hydroxide final particles by:
adding a third aqueous acidic leach solution comprising metal salts, a third aqueous chelating agent solution, and a third aqueous base solution to the slurry of metal hydroxide intermediate particles in the third stage reactors, wherein a leach feed rate of the third aqueous acidic leach solution is greater than a leach feed rate of the second aqueous acidic leach solution, and
co-precipitating the metal salts from the third aqueous leach solution at a third pH and at a third stir rate to form the slurry of metal hydroxide final particles, f) transferring the slurry of metal hydroxide final particles from the third stage reactors to four or more fourth stage reactors of the multi-stage reactor system, wherein the multi-stage reactor system includes more fourth stage reactors than third stage reactors, and g) forming a slurry of spherical metal hydroxide particles by:
adding a fourth aqueous acidic leach solution comprising metal salts, a fourth aqueous chelating agent solution, and a fourth aqueous base solution to the slurry of metal hydroxide final particles in the fourth stage reactors, wherein an amount of the fourth aqueous acidic leach solution is less than an amount of the third aqueous acidic leach solution, and
co-precipitating the metal salts from the fourth aqueous leach solution at a fourth pH and at a fourth stir rate to form the slurry of spherical metal hydroxide particles.

2. The method of claim 1, wherein the first aqueous acidic leach solution is added to the first aqueous chelating agent solution and the first aqueous base solution in the first reactor.

3. The method of claim 1, wherein the metal salts of the first aqueous acidic leach solution, the second aqueous acidic leach solution, the third aqueous acidic leach solution, and the fourth aqueous acidic leach solution are the same and comprise a nickel salt, a cobalt salt, and a manganese salt.

4. The method of claim 3, wherein the nickel salt is nickel sulfate, the cobalt salt is cobalt sulfate, and the manganese salt is manganese sulfate.

5. The method of claim 3, wherein the first aqueous acidic leach solution, the second aqueous acidic leach solution, the third aqueous acidic leach solution, and the fourth aqueous acidic leach solution further comprise sulfuric acid.

6. The method of claim 1, wherein at least one of the first aqueous acidic leach solution, the second aqueous acidic leach solution, the third aqueous acidic leach solution, and the fourth aqueous acidic leach solution is obtained by:
leaching a black mass from a recycled lithium-ion battery stream with an aqueous acid to obtain a ratio of the metal salts, and
adjusting the ratio of the metal salts to a selected ratio with additional metal salts.

7. The method of claim 1, wherein the first aqueous chelating agent solution, the second aqueous chelating agent solution, the third aqueous chelating agent solution, and the fourth aqueous chelating agent solution are the same and comprise an ammonium salt.

8. The method of claim 7, wherein the ammonium salt is ammonium hydroxide at a concentration of from 1M to 9M.

9. The method of claim 1, wherein the first aqueous base solution, the second aqueous base solution, the third aqueous base solution, and the fourth aqueous base solution comprise a hydroxide base at a concentration of from 0.5M to 5M.

10. The method of claim 9, wherein the hydroxide base is sodium hydroxide.

11. The method of claim 1, wherein the third pH is the same as the second pH and the third stir rate is the same as the second stir rate.

12. The method of claim 1, wherein the slurry of metal hydroxide seeds is transferred from the first stage reactor to the second stage reactors when the metal hydroxide seeds have a D50 of less than 3 μm.

13. The method of claim 1, wherein the slurry of metal hydroxide intermediate particles is transferred from the second stage reactors to the third stage reactors when the metal hydroxide intermediate particles have a D50 of between 3 μm and 7 μm.

14. The method of claim 1, wherein the slurry of metal hydroxide final particles is transferred from the third stage reactors to the fourth stage reactors when the metal hydroxide final particles have a D50 of between 7 μm and 10 μm.

15. The method of claim 1, further comprising transferring the slurry of spherical metal hydroxide particles from the fourth stage reactors to at least one holding tank.

16. The method of claim 1, wherein the first pH is in a range of from 11 to 12.5, the second pH and the third pH are in a range of from 10.5 to 12, and the fourth pH is greater than 10.5.

17. The method of claim 1, wherein the slurry of metal hydroxide seeds, the slurry of metal hydroxide intermediate particles, the slurry of metal hydroxide final particles, or the slurry of spherical metal oxide particles further comprises unprecipitated metal salts that are co-precipitated in a subsequent stage of the multi-stage reactor system.

18. The method of claim 1, wherein the spherical metal oxide particles have a D50 of between 13 and 15 μm and a tap density value between 1.5 and 2.5 g/mL.

\* \* \* \* \*